(12) United States Patent
Westhues (10) Patent No.: US 9,329,708 B2
(45) Date of Patent: May 3, 2016

(54) DISPLAY SYSTEM WITH ELECTROSTATIC AND RADIO LINKS

(71) Applicant: MICROSOFT TECHNOLOGY LICENSING, LLC, Redmond, WA (US)

(72) Inventor: Jonathan Westhues, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/150,695

(22) Filed: Jan. 8, 2014

(65) Prior Publication Data

US 2015/0193033 A1 Jul. 9, 2015

(51) Int. Cl.
*G06F 3/041* (2006.01)
*G06F 3/038* (2013.01)
*G06F 3/0354* (2013.01)
*G06F 3/044* (2006.01)

(52) U.S. Cl.
CPC .......... *G06F 3/0383* (2013.01); *G06F 3/03545* (2013.01); *G06F 3/041* (2013.01); *G06F 3/044* (2013.01); *G06F 3/0412* (2013.01); *G06F 3/0414* (2013.01); *G06F 3/0416* (2013.01); *G06F 2203/0384* (2013.01); *G06F 2203/04106* (2013.01); *G06F 2203/04112* (2013.01)

(58) Field of Classification Search
CPC ... G06F 3/03545; G06F 3/0383; G06F 3/044; G06F 2203/0384
See application file for complete search history.

(56) References Cited

U.S. PATENT DOCUMENTS

| | | | |
|---|---|---|---|
| 7,249,256 B2 | 7/2007 | Hansen et al. | |
| 8,493,359 B2 | 7/2013 | Wright et al. | |
| 2004/0143730 A1 | 7/2004 | Wen et al. | |
| 2005/0058292 A1 | 3/2005 | Diorio et al. | |
| 2006/0138228 A1 | 6/2006 | Sanders et al. | |

(Continued)

FOREIGN PATENT DOCUMENTS

EP 2172834 A2 4/2010

OTHER PUBLICATIONS

Perlin, "Quikwriting: Continuous Stylus-based Text Entry", In Proceedings of the 11th annual ACM symposium on User interface software and technology, Nov. 1, 1998, 2 pages.

(Continued)

*Primary Examiner* — Lixi C Simpson
(74) *Attorney, Agent, or Firm* — Brandon Roper; Judy Yee; Micky Minhas (57) ABSTRACT

Systems and methods for transmitting information in interactive display systems are provided. In one example, an interactive display system comprises an interactive display including an electrode matrix having row and column electrodes, the row electrodes being sequentially driven, a display-side radio transceiver, and an input device including an electrode tip and an input device-side radio transceiver. The interactive display is configured to transmit a channel identifier in an electrostatic link formed between the electrode matrix of the display and the electrode tip of the input device, and the input device is configured to detect a position signal indicating a nearest row electrode in the electrode matrix adjacent which the electrode tip is positioned, and to transmit data indicating the nearest row electrode to the interactive display via a radio link between the input device side transceiver and the display side transceiver on a channel identified by the channel identifier.

20 Claims, 6 Drawing Sheets

(56) References Cited

U.S. PATENT DOCUMENTS

| | | |
|---|---|---|
| 2006/0224048 A1 | 10/2006 | Devaul et al. |
| 2007/0247445 A1 | 10/2007 | Lynggaard et al. |
| 2007/0293142 A1 | 12/2007 | Dehmas et al. |
| 2010/0085325 A1* | 4/2010 | King-Smith et al. ......... 345/174 |
| 2010/0194547 A1* | 8/2010 | Terrell et al. ................ 340/407.2 |
| 2011/0007037 A1* | 1/2011 | Ogawa .......................... 345/179 |
| 2011/0058674 A1 | 3/2011 | Campbell et al. |
| 2011/0304583 A1 | 12/2011 | Kruglick |
| 2012/0013555 A1* | 1/2012 | Maeda et al. ................. 345/173 |
| 2012/0050207 A1 | 3/2012 | Westhues et al. |
| 2012/0050231 A1 | 3/2012 | Westhues et al. |
| 2012/0105361 A1 | 5/2012 | Kremin et al. |
| 2012/0105362 A1 | 5/2012 | Kremin et al. |
| 2012/0327041 A1 | 12/2012 | Harley et al. |
| 2013/0106717 A1 | 5/2013 | Sundara-Rajan et al. |
| 2013/0106719 A1 | 5/2013 | Sundara-Rajan et al. |
| 2013/0113725 A1* | 5/2013 | Seo et al. ..................... 345/173 |
| 2013/0207926 A1 | 8/2013 | Kremin et al. |
| 2013/0207938 A1 | 8/2013 | Ryshtun et al. |
| 2013/0278550 A1* | 10/2013 | Westhues ..................... 345/174 |
| 2014/0028576 A1* | 1/2014 | Shahparnia ................... 345/173 |
| 2014/0176495 A1* | 6/2014 | Vlasov .......................... 345/174 |
| 2015/0363012 A1 | 12/2015 | Sundara-Rajan et al. |
| 2015/0373083 A1 | 12/2015 | Geurts et al. |

OTHER PUBLICATIONS

Westhues, U.S. Appl. No. 14/330,981, "Cryptographic Key Exchange over Electrostatic Channel", filed Jul. 14, 2014, 38 pages.

ISA European Patent Office, International Search Report and Written Opinion Issued in Application No. PCT/US2014/071330, Mar. 30, 2015, WIPO, 9 pages.

ISA European Patent Office, International Search Report and Written Opinion Issued in Application No. PCT/US2015/039629, Oct. 9, 2015, WIPO, 16 pages.

* cited by examiner

DISPLAY SYSTEM WITH ELECTROSTATIC AND RADIO LINKS

BACKGROUND

Interactive displays have been developed that receive user input from styluses. In one type of implementation, each stylus is linked by a radio link to the interactive display. Upon activation of the stylus, the radio link is established. Once established, when the stylus is placed near the display the stylus can report its X-Y position to the interactive display via the radio link. To ascertain its X-Y position, the stylus makes electrostatic measurements via an electrode at its tip. This electrode receives signals from or transmits signals to electrodes in the interactive display that are arranged in rows and columns and sequentially driven in cycles. The stylus can detect the precise timing at which a capacitance between the electrode tip and a row (or column) underneath is driven high (or, in some cases, is driven low). Based on this, the stylus can ascertain its row (or column) position. In sequential cycles, the stylus ascertains its row and column position. The stylus can report measurements made by the stylus via the radio link to the interactive display, which, in combination with measurements made by electronics within the interactive display, can be used to ascertain the stylus's row and column position. The interactive display can process the input accordingly to display, for example, a GUI element such as a cursor at the reported location of the stylus.

One drawback with such an approach is that the process of establishing the radio link can take a user perceptible amount of time, which can cause frustration for the user. This delay is caused by the fact that the interactive display typically communicates wirelessly on multiple channels with styluses, and hops between the channels by methods such as frequency hopping spread spectrum techniques. At a 60 Hz clock cycle, hopping over a typical 38 channels can cause up to 0.63 seconds of delay under ideal transmission conditions, and longer delays can result under real world transmission conditions in which radio transmissions are interfered with and transmitted data is lost. Delays of this magnitude are perceptible to users, and can cause frustration, for example, in scenarios, such as brainstorming sessions, presentations, etc., where a premium is placed on quick user interaction with the display.

SUMMARY

To address the above challenges, systems and methods for transmitting information in an interactive display system are provided. In one example, the interactive display system comprises an interactive display including an electrode matrix having row and column electrodes, the row electrodes being sequentially driven, a display-side radio transceiver, and an input device including an electrode tip and an input device-side radio transceiver. The interactive display is configured to transmit a channel identifier in an electrostatic link formed between the electrode matrix of the display and the electrode tip of the input device, and the input device is configured to detect a position signal indicating a nearest row electrode in the electrode matrix adjacent which the electrode tip is positioned, and to transmit data indicating the nearest row electrode to the electrode tip via a radio link between the input device-side transceiver and the display side transceiver on a channel identified by the channel identifier.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
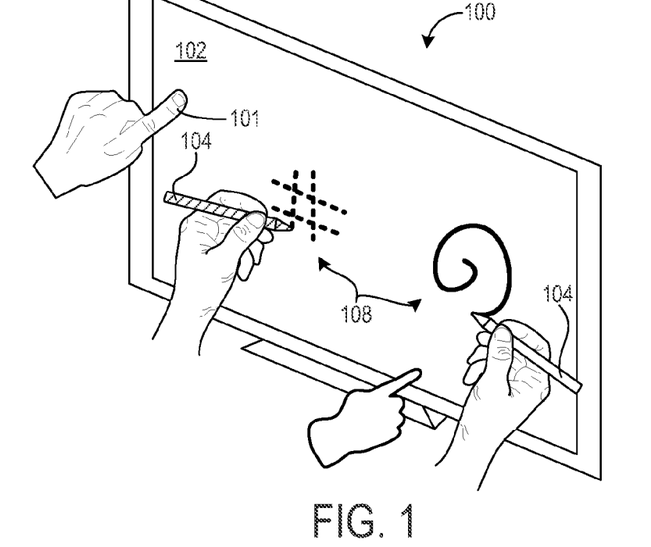
FIG. 1 is a schematic view of an exemplary interactive display system in accordance with an embodiment of the present disclosure.

FIG. 1 shows an exemplary interactive display system 100 in accordance with an embodiment of the present disclosure. System 100 includes an interactive display 102 configured to concurrently sense input from multiple sources. For example, display 102 may sense touch input applied by human digits 101 as well as input applied by one or more input devices. The input devices may be in the form of styluses 104, or may be configured in another suitable form factor. As shown and described in more detail below, appropriate graphical output 108 may be generated and displayed in response to the reception of input at display 102.

Figure 2:
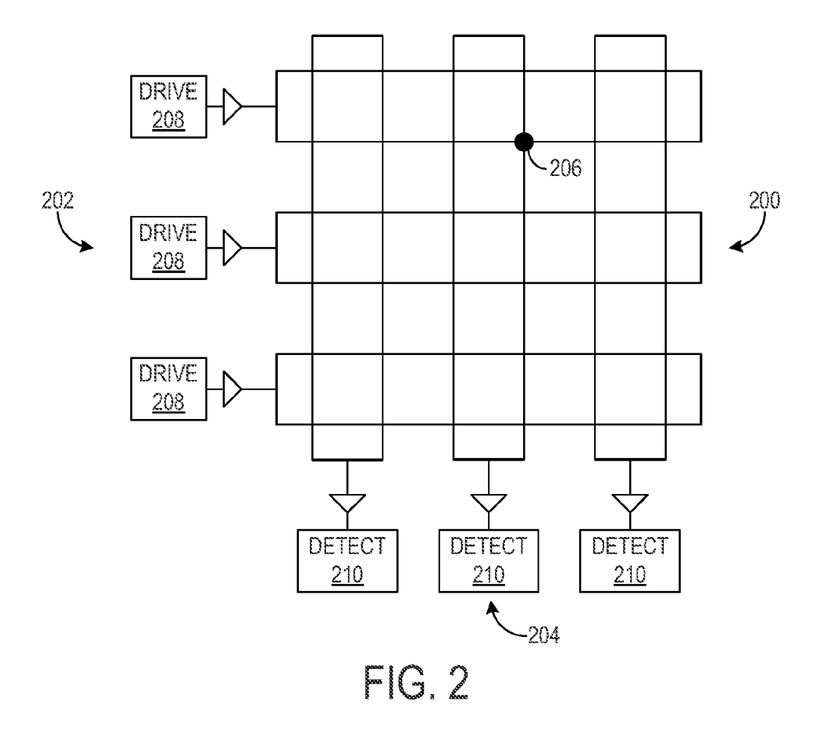
FIG. 2 is a schematic view of an electrode matrix of the interactive display system of FIG. 1.

FIG. 2 schematically shows an exemplary electrode matrix 200 that may be included in interactive display system 100 to facilitate input detection. Matrix 200 includes a plurality of row electrodes 202 and a plurality of column electrodes 204 that are vertically separated from one another and form nodes (e.g., node 206) whose electrical properties (e.g., capacitance) may be monitored to detect touch input and stylus input.

The plurality of row electrodes 202 may be electrically coupled to respective drive circuits 208 configured to drive the row electrodes in various manners described below. Conversely, the plurality of column electrodes 204 may be electrically coupled to respective detect circuits 210 which may detect currents and/or voltages in the column electrodes resulting from the driving of the plurality of row electrodes 202, the application of voltages to display 102 by styluses 104, and/or the touch of digit 101 to the display. In other embodiments, however, detect circuits may instead be coupled to the plurality of row electrodes 202 with the plurality of column electrodes 204 being driven. The electrode matrix so constructed may be used to detect not only touch inputs from the digit of a user, but also to ascertain at least one coordinate of the position of an input device such as stylus 104, as described below. It will be appreciated that the number of rows and columns shown in FIG. 2 is for illustrative purposes only, and that in a typical display many more columns and rows are included in matrix 200 than are illustrated in FIG. 2.

Figure 3:
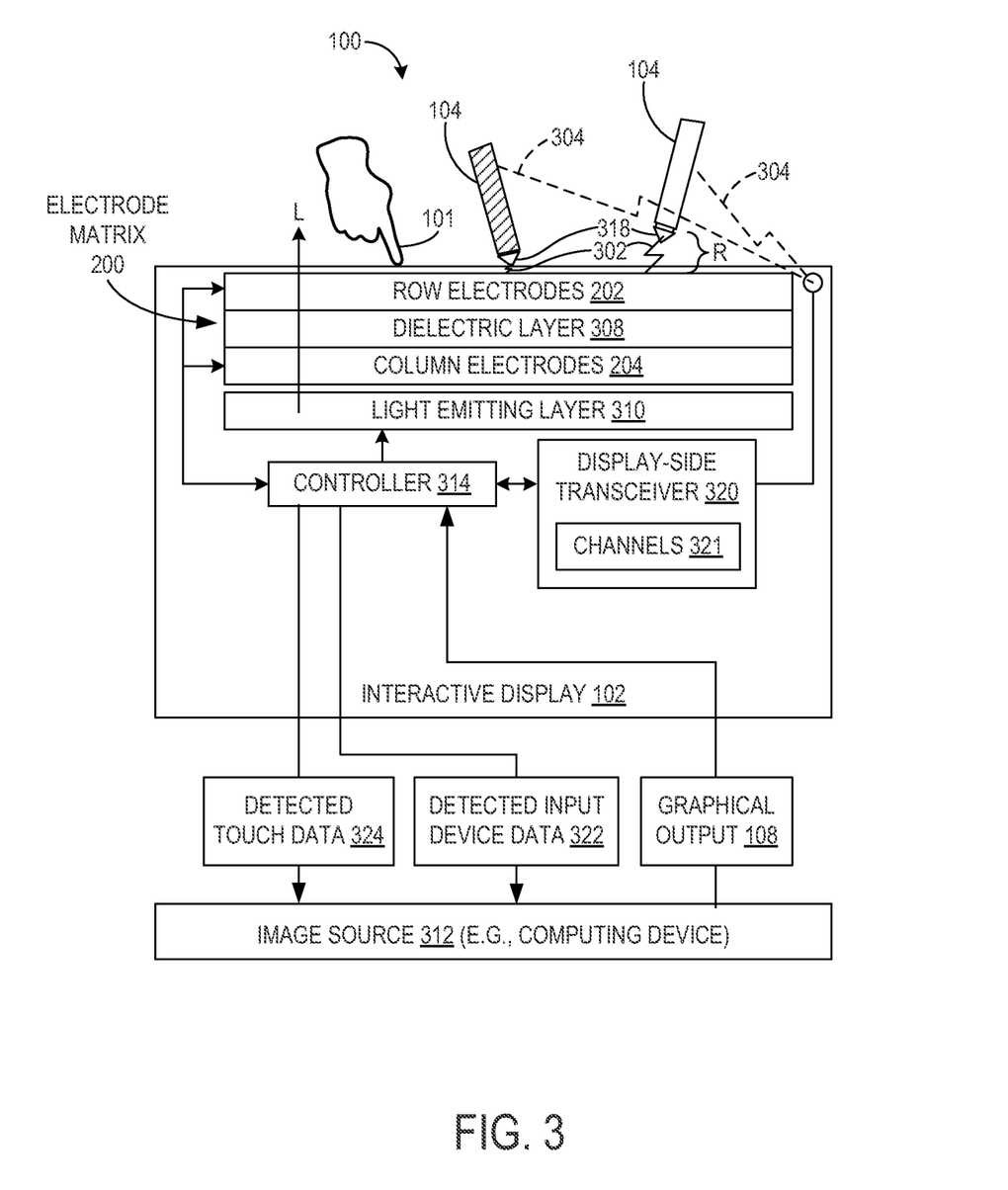
FIG. 3 is a block diagram illustrating internal components of the interactive display system of FIG. 1.

Turning now to FIG. 3, a schematic diagram illustrating additional internal components of interactive display system 100 is shown. As shown, system 100 includes interactive display 102 which comprises the electrode matrix 200 described above having a plurality of row electrodes 202 positioned above (in a light emitting direction) a plurality of column electrodes 204. The plurality of row and column electrodes 202 and 204 are separated by a dielectric layer 308, which may be comprised of various suitable dielectric materials (e.g., glass, polyethylene terephthalate (PET), cyclic olefin polymer (COP) film, etc.). Positioned below electrode matrix 200 (relative to the light emitting direction) is a light emitting layer 310, which may be a liquid crystal display (LCD) stack, light-emitting diode (LED) stack, organic light emitting diode (OLED) stack, or a plasma display panel (PDP), for example. Light emitting layer 310 is configured to emit light L through electrode matrix 200 such that the light travels through a top surface of interactive display 102 and appears to a user as an image displayed on the top surface of the display. The light emitting layer 310 and electrode matrix 200 are operated under the control of a controller 314.

Interactive display system 100 further includes an image source 312, which may receive input in the form of detected touch data 324 and detected input device data 322 from electrode matrix 200 via controller 314, process the input at the image source 312, and generate appropriate graphical output 108 in response, which is sent back to the controller 314 for display via the light emitting layer 310 of interactive display 102. Image source 312 may be an external computing device, as shown, or a computing device integrated into the housing of the interactive display 102, and may include suitable programs, processors, and storage subsystems to carry out the functions described herein. An example computing device that may be used as image source 312 is described below with reference to FIG. 7.

To facilitate the establishment of communication links between various styluses 104 and the interactive display 102, the interactive display 102 may communicate with proximate styluses 104 via respective electrostatic links 302 established between electrode matrix 200 and the proximate styluses 104. The electrostatic links 302 may be formed between matrix 200 and an electrode tip 318 of each stylus 104 when the electrode tip is positioned at a distance that is within a vertical range R from the plurality of row electrodes 202. R represents the range within which the electrostatic link may be formed. In some examples, R may be a range from 0 to 1 meter, from 0 to 20 centimeters, or from 0 to 5 centimeters. It will be appreciated that the system may be configured to utilize other suitable range values. As described below, a variety of types of information may be communicated via the electrostatic link 302, including a radio channel by which the interactive display and the stylus 104 are to communicate. Since the establishment of the electrostatic link and the communication of the radio channel can be accomplished as fast as 1 frame at a 60 Hz scan rate, the pairing may be accomplished in as fast as $\frac{1}{60}^{th}$ of a second in some embodiments, which is a significant improvement over conventional pairing methods.

Figure 5:
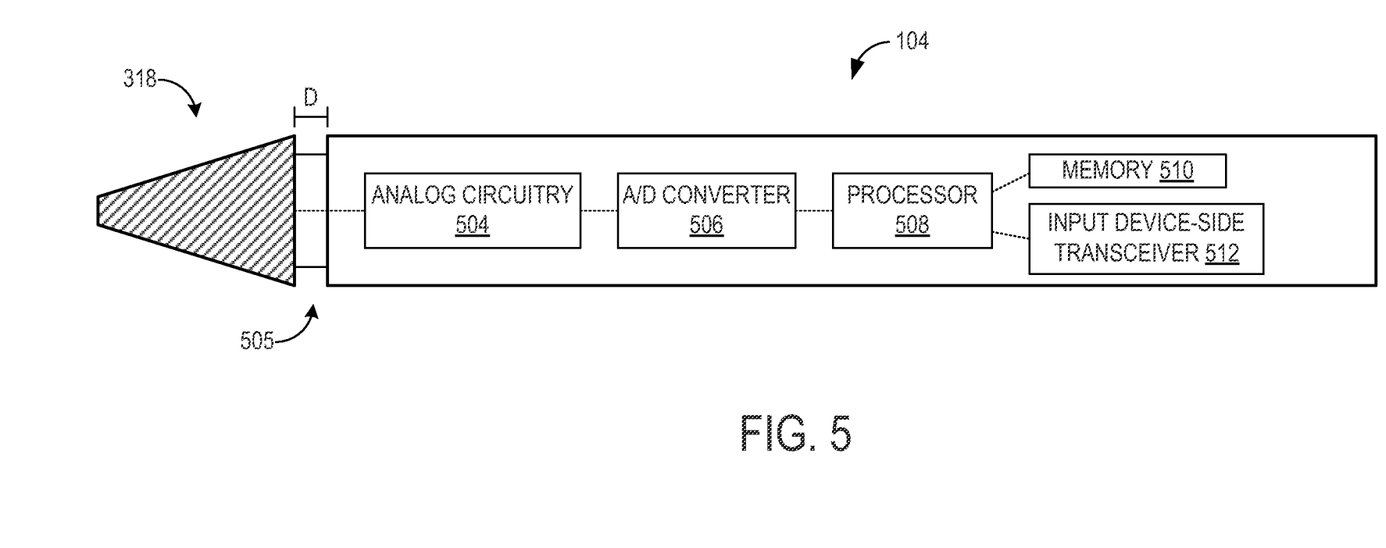
FIG. 5 is a schematic view of the input device of the interactive display system of FIG. 1.

As alluded to above, interactive display system 100 may also communicate with styluses 104 via respective bidirectional radio links 304 established between a display-side radio transceiver 320 and input device-side radio transceivers 512, illustrated in FIG. 5. It will be appreciated that each of the radio links 304 is formed over a different channel from among a plurality of possible channels 321 used to communicate wirelessly between display-side transceiver 320 and input device side transceivers 512, or over the same channel, but with each input device-side radio transceiver 512 assigned to a different timeslot within that channel.

As stylus 104 is first brought within range R of the display, the controller 314 of interactive display 102 is configured to communicate both channel information of the channel in use by display side transceiver 320 and a synchronization pattern via the electrode matrix and the electrostatic link 302 to the electrode tip 318 of the stylus 104. Using this information, the stylus 104 is able to establish a radio link 304 on the channel in use with the display-side transceiver, and is able to establish a shared sense of timing with the interactive display based on the synchronization pattern, which enables the stylus to accurately ascertain its Y (i.e., row) position based on changes in capacitance between the electrode tip and the nearest row electrode as the electrode matrix is driven in cycles.

Detected input device data 322 including the Y (row) position of the stylus 104 received via the radio link 304 and the X (column) position of the stylus 104 sensed by the electrode matrix 200 is sent to the image source 312, along with any detected touch data 324 from a digit of the user. In addition to the X, Y (column, row) position of the stylus 104, the detected input device data 322 may include an indication of whether the electrode tip 318 is depressed or not. Other data may also be included in the detected input device data 322 such as a clock sync signal, a mode indication (write or erase), and an input device identifier, etc. The detected touch data 324 typically includes the X, Y data of the detected touch of the digit of a user. Program logic at the image source receives the detected input device data 322 and detected touch data 324 and performs programmatic processing to generate graphical output 108. The graphical output 108 is sent from the image source 312 to the controller 314, which in turn controls the light emitting layer 310 in a manner suitable to display the graphical output 108 on display 102, as described above. In FIG. 3, the stylus 104 on the left is shown touching the display surface, depressing the electrode tip of the stylus, while the stylus 104 on the right is shown hovering with the electrode tip 318 in an undepressed state and positioned within range R.

Figure 4:
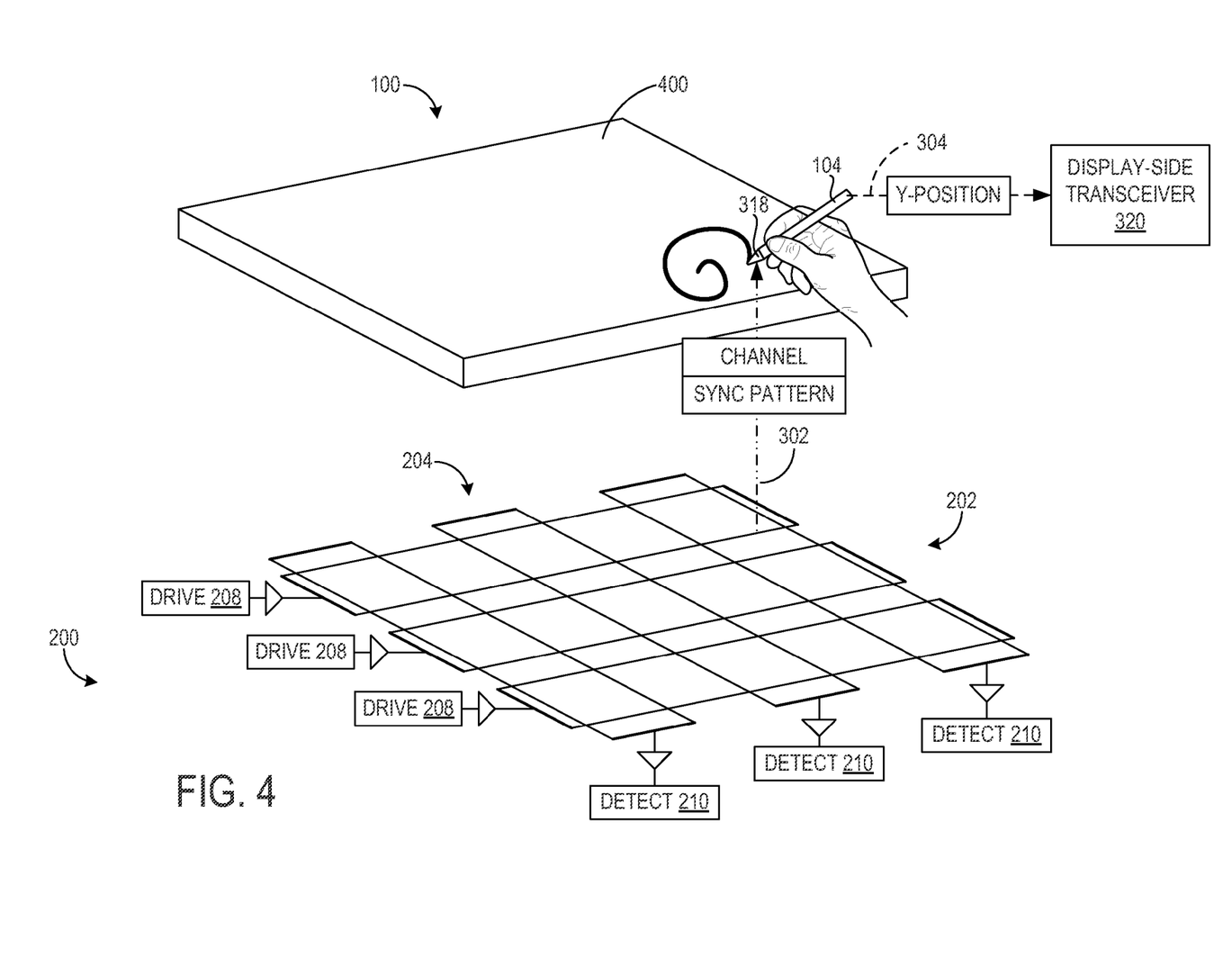
FIG. 4 is a schematic view illustrating the transmission of data between the interactive display and the stylus of the interactive display system of FIG. 1.

FIG. 4 is a partial exploded view of interactive display system 100, illustrating how the interactive display system 100 establishes a communication link with stylus 104. In the exploded view, a surface 400 configured to display graphical output 108 and receive input from a digit of a user or from stylus 104 is shown. Surface 400 may be a top surface of a protective layer positioned above the plurality of row electrodes 202, for example. FIG. 4 also shows electrode matrix 200 positioned below surface 400 respective to a light emitting direction, with an electrostatic link 402 formed between the electrode matrix and electrode tip 318 of stylus 104. It will be appreciated, however, that the separation between surface 400 and electrode matrix 200 is exaggerated for the sake of illustration, and that the composition and placement of these components are not intended to be limiting in any way.

In some embodiments, drive circuits 208 of electrode matrix 200 may be driven by a microcoded state machine implemented within a field-programmable gate array (FPGA) which forms part of controller 314, for example. Each drive circuit 208 may be implemented as a shift register having one flip-flop and output for each row electrode, and may be operable to force all output values to zero, independently of register state. The inputs to each shift register may be a clock, data input, and a blanking input, which may be driven by outputs from the microcoded state machine. Signals may be transmitted by filling the shift register with ones on every output to be excited, and zeroes elsewhere, and then toggling the blanking input with a desired modulation. If the shift register is used in this fashion, the output voltage may take on only two values. In other implementations, other circuitry may be used to permit the output voltage to take on a greater range of values, for example to reduce the harmonic content of the output waveforms and decrease the emissions radiated by interactive display system 100.

Stylus 104 may detect position signals as the plurality of row electrodes 202 are sequentially driven to thereby determine at least a portion of its position relative to interactive display system 100. In particular, electrode tip 318 of stylus 104 may receive a different current during the phases in which each row electrode in the plurality of row electrodes 202 is successively driven. The highest received current may indicate a row electrode nearest electrode tip 318, for example. A method for determining the position of stylus 104 relative to interactive display system 100 is described below with reference to FIG. 6. In addition, stylus 104 may detect other signals via electrode tip 318 produced by operating the shift registers in the manner described above.

Having detected position signals, stylus 104 may transmit data regarding at least a portion of its position relative to interactive display system 100 via radio link 304 established between display-side radio transceiver 320 and an input device-side radio transceiver, shown at 512 in FIG. 5. Transmission over radio link 304 may occur on a predetermined radio channel, which may be one of a plurality of radio channels in a predetermined radio frequency hopping sequence. Channel identifiers that identify a current radio channel for transmission via radio link 304 may be transmitted to stylus 104 via electrostatic link 302, as described in further detail below.

FIG. 5 shows a block diagram of stylus 104 shaped as a stylus in accordance with an embodiment of the present disclosure. As described above, stylus 104 includes an electrode tip 318 that is electrically conductive and configured to receive current when proximate driven electrode matrix 200. As shown, tip 318 is operatively coupled to analog circuitry 504, which is configured to convert currents received at the tip to corresponding voltages. Analog circuitry 504 may further include a voltage source configured to hold tip 318 at a constant voltage, or, during other modes of operation, apply time-varying voltages to the tip, as described in further detail below.

In some embodiments, electrode tip 318 may be a switchable tip including a depressible switch 505 configured to provide a first output if stylus 104 is in contact with a surface (e.g., depressed against surface 400) and a second output if the stylus is not in contact with a surface (e.g., not depressed). Output from switch 505 may then be relayed to the interactive display 102 via radio link 304 so that hover input may be distinguished from contact input, that is, so that the interactive display 102 may determine whether stylus 104 is in contact with the surface 400 or not in contact but hovering over the surface 400 of the interactive display 102.

In some embodiments, electrode tip 318 may be configured to measure force. Accordingly, tip 318 may generate an output in a range of outputs which indicates the force sensed by the tip. As shown in FIG. 5, tip 318 is spaced away from the body of the stylus 104 by a distance D, which may be reduced as the tip is depressed. The tip may be biased outward by a spring, and the degree to which the distance D is closed may be sensed as a proxy of the force exerted on the tip.

Stylus 104 further includes an analog-to-digital (A/D) converter 506 operatively coupled to analog circuitry 504 and configured to digitize voltages received from the analog circuitry. As a non-limiting example, converter 506 may convert incoming electrostatic signals having bandwidths of 100 kHz at a sampling rate of 1 Mbit/s.

Stylus 104 further includes a processor 508 operatively coupled to A/D converter 506, memory 510, and an input device-side radio transceiver 512. Processor 508 is configured to process digitized signals from converter 506, execute instructions held in memory 510, and control input device-side transceiver 512. In some embodiments, input device side-transceiver 512 may be configured to transmit and receive signals having frequencies between 2.4 GHz and 2.5 GHz, for example, and may be operatively coupled to processor 508 via a synchronous serial port.

To pair stylus 104 with the interactive display 102 and establish the radio link 304 on an appropriate channel, the controller 314 of interactive display 102 may communicate a radio channel in use via the electrode matrix 200, by driving the electrode matrix in a way that encodes the radio channel information in a portion of the driven signal, as discussed below. The stylus 104 may electrostatically receive the radio channel identifier, along with a synchronization pattern, via electrode tip 318 from electrode matrix 200, via the electrostatic link 302. Processor 508 may then execute instructions stored in memory 510 to retrieve a radio frequency from a table or other suitable data structure stored in the memory based on the radio channel identifier transmitted from electrode matrix 200. Stylus 104 may then transmit data via radio link 304 formed between input device-side transceiver 512 and display-side radio transceiver 320 at the retrieved radio frequency, for example. In this way, the stylus may transmit position information, such as the row position (Y coordinate) of the stylus relative to the electrode matrix 200, from the stylus to the interactive display via the radio link, as described in detail with reference to FIG. 6.

Moreover, processor 508 may execute instructions held in memory 510 to calculate subsequent frequencies of a frequency hopping sequence, to enable the stylus 104 and interactive display 102 to communicate via frequency hopping spread spectrum techniques.

Stylus 104 may be configured to sever an established radio link if the stylus is separated from interactive display 102 by at least a threshold distance for at least a threshold duration. The threshold distance may, for example, be the outermost limit of range R, described above. Alternatively, a threshold distance less than the outermost limit of range R may be determined, and sensed by sensing the signal strength of the electrostatic link, for example. Severing the link will allow the stylus to power down the radio transceiver in an effort to conserve power, and doing so after the threshold duration has passed will help ensure that the radio link is not cut when the stylus 104 is temporarily brought out of range then back into range during a short duration of time.

Figure 6:
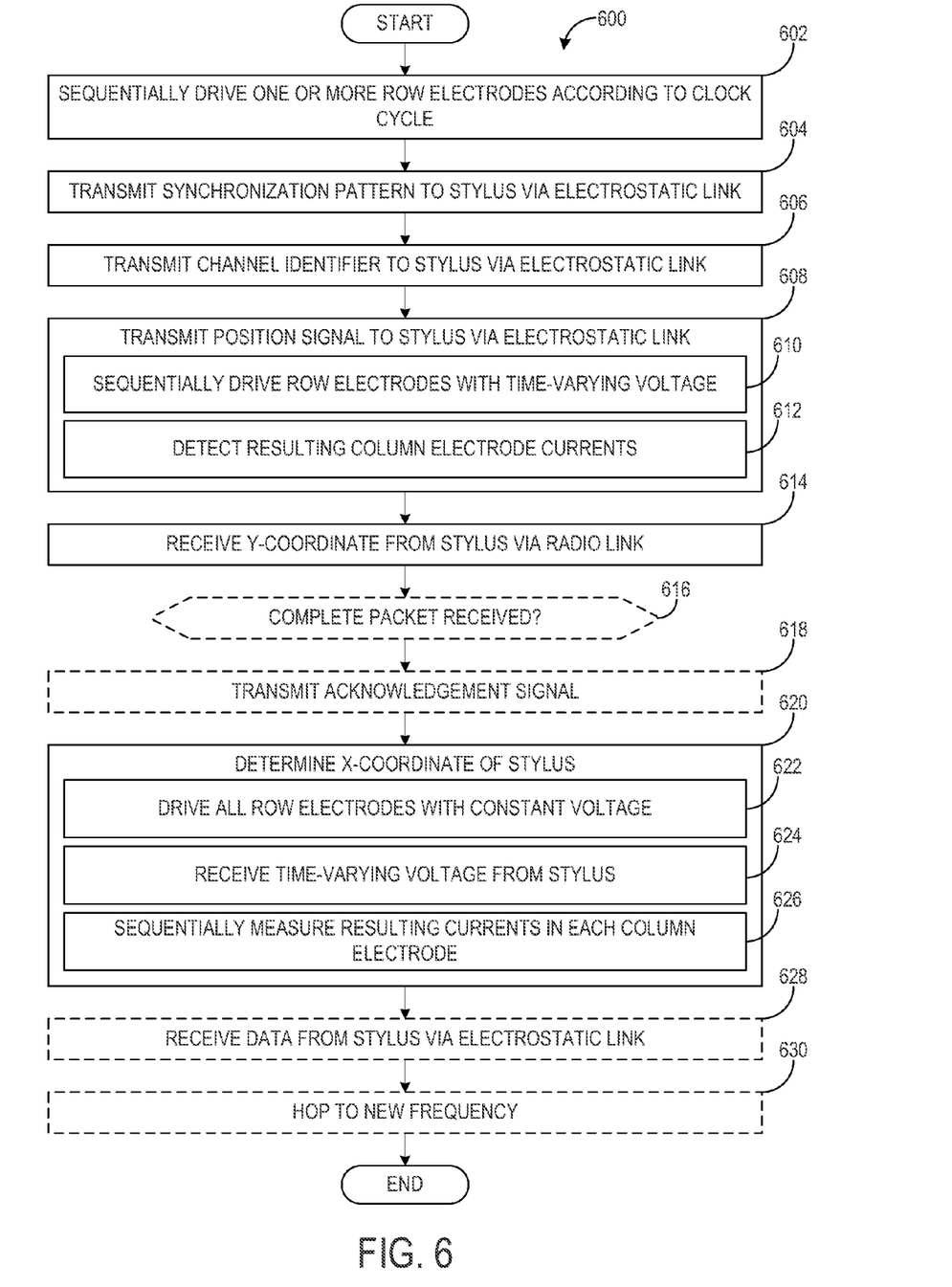
FIG. 6 is a flowchart of an embodiment of a method of transmitting information between an interactive display and an input device.

Turning now to FIG. 6, a flowchart illustrating a method 600 of transmitting information from an interactive display to an input device is shown. Method 600 may be implemented in interactive display system 100, for example, and used to transmit information between interactive display 102, electrode matrix 200, and stylus 104 via electrostatic links 302 and radio links 304 established therebetween.

At 602 of method 600, one or more row electrodes of an electrode matrix of an interactive display are sequentially driven according to a clock cycle. The one or more row electrodes may be sequentially driven during an input detection mode in order to detect touch input and stylus input applied at or above the interactive display. In some embodiments, sequential driving at 602 may include driving the one or more row electrodes at a clock cycle of 60 Hz with time-varying voltages, although other variations are possible.

Next, at 604 of method 600, a synchronization pattern is transmitted to the stylus via an electrostatic link established between the stylus and the electrode matrix of the interactive display. The synchronization pattern may be used to synchronize timing between the stylus and the interactive display. For example, the synchronization pattern may indicate to the stylus the position of a sequence in which a plurality of row electrodes in the electrode matrix are sequentially driven. In some embodiments, the synchronization pattern may be applied to two or more row electrodes so that the stylus may receive the pattern with an acceptable amplitude regardless of the position of the stylus.

Next, at 606 of method 600, a channel identifier is transmitted to the stylus via the electrostatic link. The channel identifier may identify a radio channel on which data may be transmitted between the stylus and interactive display over a radio link therebetween—for example, between stylus-side radio transceiver 512 and display-side radio transceiver 320.

In some embodiments, the channel identifier may comprise six bits that are transmitted to the stylus every frame. "Frame" as used herein refers to the duration taken to scan the electrode matrix for applied inputs. The six channel identifier bits may be interpreted as an integer between 0 and 63, and that integer may be interpreted as a radio channel. For example, a table stored in memory (e.g., memory 510) in the stylus may contain a list of 64 radio center frequencies (e.g., 2.406 GHz, 2.407 GHz, 2.409 GHz, etc.), and the integer may be used as an index into that table such that transmission between the stylus and display-side radio transceiver may occur on an agreed frequency.

Transmission of the channel identifier may include utilization of a suitable modulation scheme that permits the channel identifier to be reliably transmitted through the channel. The frequency spectrum of that modulation may be chosen within the same constraints as the frequency of the excitation waveforms used to detect inputs applied to the interactive display—for example, that it be as high as possible, to permit as many measurements as possible to be made within the same time, but low enough that the low-pass effect of the electrode matrix resistance against the capacitances under test and other stray capacitances does not unacceptably attenuate the transmission.

As one non-limiting example, the channel identifier bits may be coded via binary phase-shift keying (BPSK) on a carrier with frequency around 100 kHz. Each bit may be coded with four carrier cycles, with a guard time of approximately one carrier cycle between bits. That bit time may be chosen to achieve a desired signal-to-noise-ratio; as the integration time during analog-to-digital conversion increases, the probability that a bit will be received incorrectly due to noise may decrease. Such noise may be dominated by environmental effects, for example a difference in voltage between a building's electrical safety grounding system (to which the interactive display is connected, through the third prong of its mains plug) and a user. In large capacitive touch sensors, noise may often be dominated by noise coupled from the interactive display. However, since currents are measured at the electrode tip of the stylus during reception of the channel identifier, and not at the electrode matrix, the electrode is shielded from the interactive display by the electrode matrix.

In some embodiments, the interactive display may be one of a plurality of interactive displays proximate one another, in which case the avoidance of interference may be desired. To reduce the probability of such interference, each display may use a different frequency hopping sequence, for example by combining a display's serial number with a lossless operation (e.g., XOR) with a number that may vary for each display, such as the last six bits of the display's serial number. In such a case the radio hopping channel may be calculated in the following manner:

cnt=(cnt+1)mod 64 ch=permutation[cnt]

ch=ch XOR serial where cnt is a counter modulo 64 incrementing once per frame, serial is the last six bits of the display's serial number, and ch is the channel. If an XOR operation is used to generate multiple hopping sequences, it may be applied after the random permutation, rather than before. Otherwise, sequences with similar serial numbers may be highly correlated. The permutation may be chosen to reduce such correlation, for example by a brute force search. It will be appreciated, however, that in other embodiments two or more different displays may use the same frequency hopping sequence in an out-of-phase manner. Specifically, each display may occupy a different time slot within the same hopping sequence at any given instant.

In some embodiments, if a radio link between the stylus and interactive display is severed (e.g., by moving the stylus away from the interactive display by a threshold distance for a threshold duration), the stylus itself may continue calculating the frequency hopping sequence. For example, a new channel may be calculated in the following manner:

ch=ch XOR serial cnt=inverse_permutation[ch]

cnt=(cnt+1)mod 64 ch=permutation[cnt]

ch=ch XOR serial where cnt is a counter modulo 64 incrementing once per frame, serial is the last six bits of the display's serial number, and ch is the channel.

For scenarios in which an electrostatic link between the stylus and electrode matrix is unavailable with which channel identifiers may be ascertained, the stylus may also establish a radio link by conventional means, for example by listening on an arbitrary channel until the frequency hopping sequence happens to use that channel. The stylus may then only use the electrostatic data when within a threshold distance from the interactive display.

Next, at 608 of method 600, a position signal is transmitted to the stylus from the electrode matrix via the electrostatic link. Transmission of the position signal may include sequentially driving each row electrode in the electrode matrix with one or more time-varying voltages at 610, and may further include detecting resulting currents in one or more column electrodes of the electrode matrix at 612. Here, the electrode matrix is operated in an input detection mode which may be used to detect input applied by human digits, for example. The driving and detection respectively performed at 610 and 612 may form what is referred to herein as a "scanning" process in which the electrode matrix is scanned to detect applied inputs.

Driving and detection of the electrode matrix in this way may also facilitate determination of at least a portion of the position of the stylus relative to the interactive display. In some embodiments, transmission of the synchronization pattern to the stylus at 604 allows the stylus to ascertain where the electrode matrix is in a sequence used to drive the row electrodes. More specifically, synchronization may allow the stylus to determine the specific row that is being driven at a given instant in time. By combining this information with capacitances (e.g., from each row to the electrode tip of the stylus) measured and stored by the stylus as the row electrodes are sequentially driven at 610, the stylus may identify a capacitance having a particular property and match that capacitance to the row driven at the time that capacitance was measured. For example, the stylus may identify the highest capacitance that was measured and match the time at which it was measured to a corresponding time at which the corresponding row was driven. The row may be identified as the row nearest the stylus and used as the basis for the y-coordinate of the stylus. Thus, in this embodiment, the interactive display may receive a parameter such as the y-coordinate from the stylus at 614 via the radio link. Alternatively, the y-coordinate may be received via the electrostatic link, if the electrostatic link is configured for bidirectional communication. As described above, other parameters may also be transmitted via the radio link from the stylus 104 to the interactive display 102.

Other approaches for determining a y-coordinate of the stylus are possible, however. In other embodiments, the stylus may transmit the time at which a capacitance having a particular property (e.g., highest capacitance) is measured and transmit that time to the interactive display which then determines a y-coordinate of the stylus. Still further, in other embodiments, the electrode matrix may electrostatically transmit data identifying the row being driven for all row electrodes in the matrix.

Next, it is optionally determined whether a complete data packet was received from the stylus at 616 via the radio link, which may be performed for embodiments in which the stylus performs reliable delivery. In these embodiments, the stylus may repeatedly transmit data packets (which may comprise various parameters such as a y-coordinate, depression of the electrode tip of the stylus, etc.) until an acknowledgment signal indicating complete reception of the data packet is sent to the stylus by the interactive display. Thus, if it is determined that a complete data packet has been received (YES), method 600 may include optionally transmitting an acknowledgement signal to the stylus from the interactive display at 618. If a complete data packet has not been received (NO), method 600 may return to 616 until a complete data packet is received.

Next, at 620 of method 600, an x-coordinate of the stylus is determined. Determination of the x-coordinate may include, at 622, driving all row electrodes in the electrode matrix with a constant voltage, and, at 624, receiving one or more time-varying voltages applied to the interactive display from the stylus. Currents resulting from the application of the time-varying voltage at 624 may then be sequentially measured in each column electrode of the electrode matrix at 626. A column electrode having a particular property (e.g., receiving the highest current) may be identified as the column electrode nearest the stylus and thus used as the basis for the x-coordinate of the stylus.

Next, at 628 of method 600, data may be optionally received from the stylus via the electrostatic link. The data may include an indication of whether the electrode tip of the stylus is depressed for embodiments in which the stylus includes a depressible switch. Alternatively or additionally, the data may include measurements of force for embodiments in which the stylus includes a force-sensitive tip. The data may include yet other information and measurements made by the stylus, including indications of whether one or more buttons on the stylus are depressed and y-coordinates that otherwise may be received via the radio link. Here, the stylus may employ a modulation scheme similar to that described above, such as BPSK. Once received via the electrostatic link, the interactive display may demodulate the transmitted data.

In some embodiments, data sent from the stylus to the interactive display via the electrostatic link may be used by the interactive display to determine at least a portion of the position of the stylus relative to the display, as the data may be received only by a subset of electrodes (e.g., column electrodes) proximate the electrode tip of the stylus.

Next, at 630 of method 600, the interactive display may optionally hop to a new frequency in a frequency hopping sequence. In some examples, the frequency hopping sequence was initiated prior to transmission of the channel identifier at 606. As described above, the frequency hopping sequence may include 64 frequencies that are selected in a defined order, which may be a permutation of the integers from 0 to 63. Other orders are possible, though for regulatory purposes, it may be desirable to use each channel the same number of times, and for the time between uses of the channel (which determines the duty cycle on a given channel) to be as large as possible. These properties may be satisfied by a hopping sequence in the form of that permutation.

It will be appreciated that frequency hopping at 630 may occur elsewhere in method 600. For example, the interactive display may hop to a new frequency in the frequency hopping sequence each frame.

As shown and described, method 600 may be utilized to rapidly synchronize an input device such as a stylus with an interactive display in a manner that may be imperceptible to users. In some scenarios, this synchronization may occur during a single frame. With synchronization established, the stylus and interactive display may transmit data to each other via electrostatic and radio links. More particularly, the radio link may be severed and reestablished based on the degree to which the stylus is separated from the interactive display, which may reduce power consumption. Other modifications to method 600 are possible—data transmitted via the electrostatic and/or radio link may encrypted via a suitable encryption scheme, for example. Moreover, method 600 may be adapted to embodiments in which the column electrodes of the electrode matrix are driven, and detect circuitry is electrically coupled to the row electrodes.

As discussed above, the methods and processes described herein may be implemented on the interactive display 102 with an external or internal image source 312, which is typically a computing device. The internal components of a computing device which may be used as image source 312 are illustrated in FIG. 7.

Figure 7:
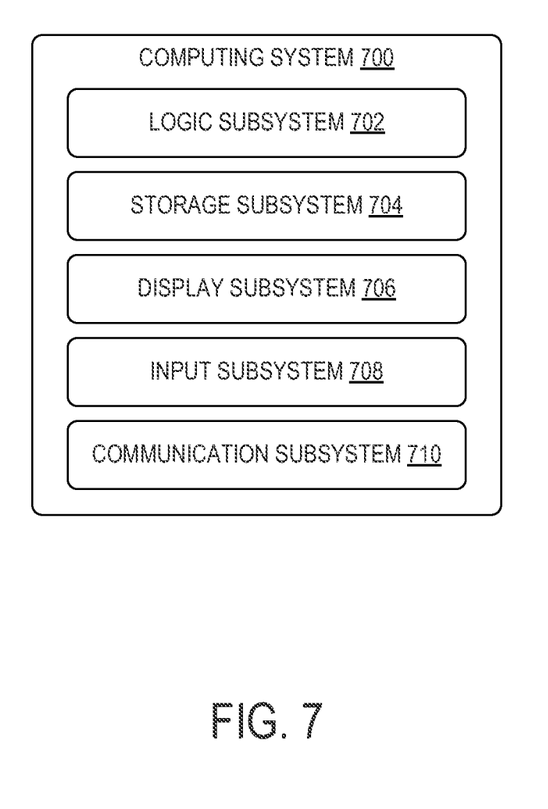
FIG. 7 shows a block diagram of a computing device in accordance with an embodiment of the present disclosure.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic subsystem 702 and a storage machine 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic subsystem 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An interactive display system, comprising:
   an interactive display including an electrode matrix having row and column electrodes, the row electrodes being sequentially driven, wherein the interactive display also includes a display-side radio transceiver; and
   an input device including an electrode tip and an input device-side radio transceiver;

wherein the interactive display is configured to transmit a channel identifier in an electrostatic link formed between the electrode matrix of the display and the electrode tip of the input device, and wherein the input device is configured to detect a position signal indicating a nearest row electrode in the electrode matrix adjacent which the electrode tip is positioned, and to transmit data indicating the nearest row electrode to the interactive display via a radio link between the input device-side transceiver and the display side transceiver on a channel of the radio link identified by the channel identifier.

2. The interactive display system of claim 1, wherein the input device includes a voltage source configured to drive the electrode tip with a time-varying voltage, and wherein the interactive display is configured to drive all row electrodes with a constant voltage and sequentially measure currents resulting from the time-varying voltage in each column electrode after receiving the data indicating the nearest row electrode to determine a nearest column electrode in the electrode matrix adjacent which the electrode tip is positioned.

3. The interactive display system of claim 1, wherein the channel identifier identifies a channel in a frequency hopping spread spectrum transmission.

4. The interactive display system of claim 1, wherein the input device includes a processor and memory holding instructions executable by the processor to:
retrieve a radio frequency from a table stored in the memory based on the channel identifier; and
transmit data via the radio link at the radio frequency.

5. The interactive display system of claim 4, wherein the interactive display transmits data via the radio link according to a frequency hopping sequence, and wherein the instructions are further executable to calculate subsequent frequencies of the frequency hopping sequence when the radio link has been severed.

6. The interactive display system of claim 1, wherein the interactive display is configured to transmit a synchronization pattern via the electrostatic link, the synchronization pattern being used to synchronize timing of sequential driving of the electrode matrix of the interactive display and the input device, the position signal detected after transmission of the synchronization pattern.

7. The interactive display system of claim 1, wherein the position signal is sent from the interactive display via the electrostatic link to the electrode tip of the input device.

8. The interactive display system of claim 1, wherein the electrode tip is configured to measure force.

9. The interactive display system of claim 8, wherein the input device is configured to transmit data indicating one or more measurements including the measured force via one or both of the electrostatic link and the radio link.

10. The interactive display system of claim 1, wherein the input device is configured to supply input to a plurality of interactive displays including the interactive display.

11. The interactive display system of claim 1, wherein the interactive display is configured to transmit an acknowledgement signal after receiving a complete data packet from the input device via the radio link, and wherein the input device is configured to sever the radio link after receiving the acknowledgement when separated from the interactive display by at least a threshold distance for at least a threshold duration.

12. The interactive display system of claim 1, wherein the electrode tip includes a depressible switch configured to provide a first output when the input device is in contact with the interactive display and a second output when the input device is not in contact with the interactive display.

13. A method of transmitting information between an interactive display and an input device, the method comprising:
transmitting a channel identifier to the input device via an electrostatic link formed between the interactive display and the input device; and
receiving a parameter from the input device via a radio link formed between a display-side radio transceiver in the interactive display and an input device-side radio transceiver in the input device, the parameter received on a channel of the radio link identified by the channel identifier.

14. The method of claim 13, wherein the parameter is a y-coordinate of the input device, the method further comprising:
determining an x-coordinate of the input device by driving all row electrodes in the electrode matrix with a constant voltage and sequentially measuring currents in each column electrode of the electrode matrix, the currents resulting from application of a time-varying voltage to the interactive display, an electrode tip of the input device being driven with the time-varying voltage.

15. The method of claim 13, further comprising receiving one or more measurements from the input device via one or both of the electrostatic link and the radio link.

16. The method of claim 15, wherein the one or more measurements include force measurements, the input device including a force-sensitive tip.

17. The method of claim 13, wherein the channel identifier identifies a channel in a frequency hopping spread spectrum transmission.

18. The method of claim 13, wherein the interactive display is configured to receive input from a plurality of input devices, each of the plurality of input devices configured to transmit coordinates via the radio link at a different phase in a frequency hopping sequence.

19. An input device, comprising:
an electrode configured to electrostatically receive data;
a radio transceiver;
a processor; and
memory holding instructions executable by the processor to:
determine a channel identifier based on the electrostatically received data; and
transmit data indicating a position of the input device via the radio transceiver on a channel identified by the channel identifier.

20. The input device of claim 19, further comprising a switchable tip configured to generate a first output when the switchable tip is depressed, and a second output when the switchable tip is not depressed.

* * * * *